(12) United States Patent
Hayashi et al.

(10) Patent No.: US 6,173,745 B1
(45) Date of Patent: Jan. 16, 2001

(54) MANIFOLD SOLENOID VALVE DRIVEN BY SERIAL SIGNALS

(75) Inventors: Bunya Hayashi; Fumio Morikawa; Katsuhisa Endo, all of Ibaraki (JP)

(73) Assignee: SMC Corporation, Tokyo (JP)

( * ) Notice: Under 35 U.S.C. 154(b), the term of this patent shall be extended for 0 days.

(21) Appl. No.: 09/522,041

(22) Filed: Mar. 9, 2000

(30) Foreign Application Priority Data

Mar. 31, 1999 (JP) .................................................. 11-92392

(51) Int. Cl.$^7$ ....................................................... F16I 31/04
(52) U.S. Cl. ............................................ 137/884; 137/269
(58) Field of Search ..................................... 137/884, 269

(56) References Cited

U.S. PATENT DOCUMENTS

| 4,854,346 | 8/1989 | Nakanishi et al. |
| 5,458,048 | * 10/1995 | Hohner ................................. 91/459 |
| 5,495,871 | 3/1996 | Meloche et al. |
| 5,699,830 | 12/1997 | Hayashi et al. |
| 5,887,623 | * 3/1999 | Nagai et al. ......................... 137/884 |
| 5,915,666 | 6/1999 | Hayashi et al. |
| 5,918,629 | 7/1999 | Hayashi et al. |

FOREIGN PATENT DOCUMENTS

| 196 46 444 A1 | 5/1998 | (DE) |
| 0 603 395 A1 | 6/1994 | (EP) |
| 0 715 108 A1 | 6/1996 | (EP) |
| 0 860 609 A2 | 8/1998 | (EP) |
| 94/04831 | 3/1994 | (WO) |

* cited by examiner

*Primary Examiner*—John Fox
(74) *Attorney, Agent, or Firm*—Oblon, Spivak, McClelland, Maier & Neustadt, P.C.

(57) ABSTRACT

In a manifold solenoid valve drive-controlled by serial signals, control systems for a single valve and a double valve are achieved by simple switching of a single control system. For this purpose, in order to transmit serial signals to solenoid valves through manifold blocks 30 on which solenoid valves 20 are mounted and which are connected, a printed circuit board 45 having connecting terminals 46*a* and 46*b* for transmitting serial signals, a slave chip 47 for extracting operation signals for the solenoid valves from the serial signals, a feeder terminal 49 for supplying power to the solenoid valves 20 based on the operation signals, and a switching device 48 for switching the slave chip between a single solenoid valve mode and a double solenoid valve mode is detachably accommodated in an electric circuit section 41 of each manifold block 30. Connecting adjacent manifold blocks 30 enables common passages 32 and 33 for supply and exhaust that penetrate the manifold blocks 30 to be placed in communication and also enables the connecting terminals 46*a* and 46*b* to be interconnected.

3 Claims, 6 Drawing Sheets

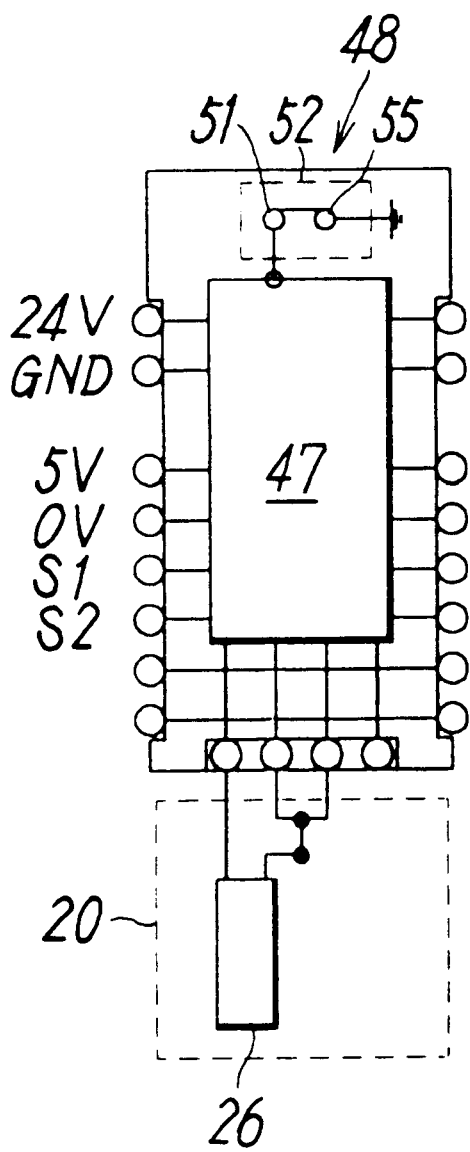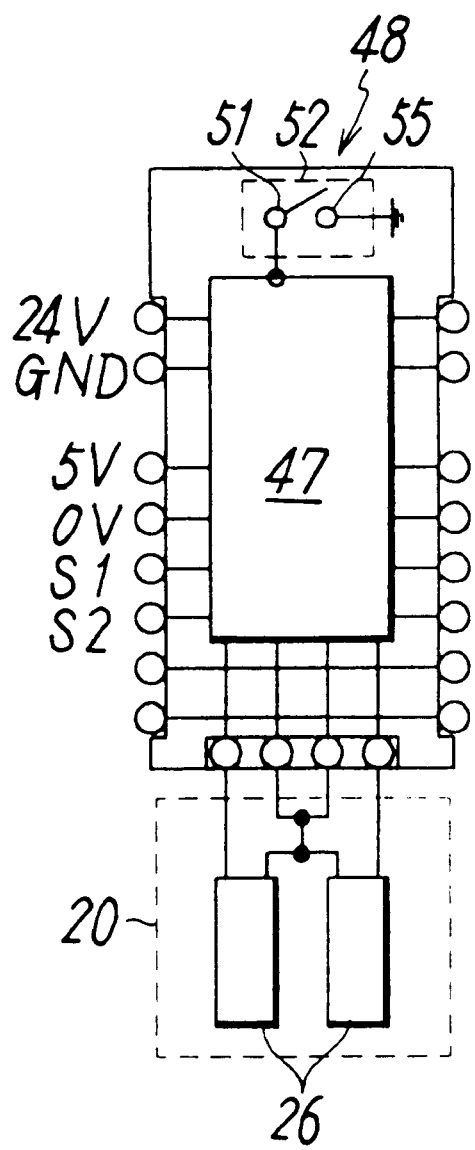

MANIFOLD SOLENOID VALVE DRIVEN BY SERIAL SIGNALS

FIELD OF THE INVENTION

The present invention relates to a manifold solenoid valve drive-controlled by serial signals and, more particularly, to a manifold solenoid valve driven by serial signals that is applicable regardless of whether a solenoid valve mounted on a manifold block is a single solenoid valve or a double solenoid valve.

DESCRIPTION OF THE RELATED ART

Conventionally, a manifold solenoid valve provided with a required number of solenoid valves, manifold blocks on which the solenoid valves are individually rested and are interconnected, and an air supply/exhaust block that supplies and exhausts compressed air through the manifold blocks has been extensively used. The solenoid valves mounted on the manifold blocks generally come in single solenoid valves (normally three-port valves: hereinafter referred to simply as "single valves") in which a passage of a main valve is switched by a single solenoid, and double solenoid valves (normally five-port valves:
hereinafter referred to simply as "double valves") in which a passage of a main valve is switched by two solenoids.

In the manifold solenoid valve, the respective solenoid valves mounted thereon can be drive-controlled by serial signals. In this case, however, the number of driven solenoids differs depending upon whether the solenoid valves are single valves or double valves, so that a control system has to be adapted to either of them. Furthermore, any of the solenoid valves respectively mounted on a plurality of manifold blocks consecutively connected are sometimes changed between single valves and double valves. Hence, there is a demand for making the control system that controls solenoid valves easily switchable.

DISCLOSURE OF THE INVENTION

A technological object of the present invention is to configure such a manifold solenoid valve so that, in implementing drive control of the manifold solenoid valve by serial signals, a control system for a single valve and that for a double valve can be configured by an easy switching operation in a single control system so as to permit easy adaptation of the control system to solenoid valves when assembling the manifold solenoid valve, and also permit the control system for controlling the solenoid valves to be easily switched when any solenoid valves mounted on manifold blocks are changed between single valves and double valves.

Another technological object of the present invention is to provide a manifold solenoid valve driven by serial signals that permits extremely easy assembly of the manifold solenoid valve and extremely easy maintenance, and eliminates a possibility of erroneous wiring.

A manifold solenoid valve in accordance with the present invention for fulfilling the aforesaid objects comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, wherein an electric circuit component having a printed circuit board provided with female and male connecting terminals for transmitting serial signals that are electrically connected with one another, a slave chip for extracting operation signals for the solenoid valves from the serial signals, a feeder terminal for supplying power to the solenoid valves based on the operation signals, and a switching device for switching the slave chip between a single valve mode and a double valve mode is detachably installed in an electric circuit section of each of adjoining manifold blocks, and the female and male connecting terminals on the printed circuit board in each manifold block are disposed at positions where they are connected with one another when common passages of the manifold blocks are communicated with one another as the manifold blocks are connected.

In the foregoing manifold solenoid valve, the switching device provided on the printed circuit board may be constructed by a switch for switching connection of a switching terminal in the slave chip to a ground end, or a short pin for selecting whether or not to connect the switching terminal to the ground end by attaching or detaching the short pin.

In the manifold solenoid valve driven by serial signals that has the configuration described above, the electric circuit component having a printed circuit board provided with female and male connecting terminals for transmitting serial signals, the slave chip for extracting operation signals from the serial signals, the feeder terminal for supplying power to the solenoid valves based on the operation signals, and the switching device for switching the slave chip between the single valve mode and the double valve mode is detachably installed in the electric circuit section of each manifold block to thereby constitute a control system for driving the respective solenoid valves. Therefore, in assembling the manifold solenoid valve, the control system for single valves and double valves can be used by alternately switching by an easy operation of the switching device in the single control system. Moreover, the control system can be easily switched by the switching device when any solenoid valves mounted on the manifold blocks are changed between single valves and double valves.

Furthermore, in the manifold solenoid valve, simply stacking and connecting the manifold blocks permits fluid passages and serial signal lines to be automatically connected, or simply detaching the manifold blocks permits the electric circuit component constituting the control system to be taken out. Hence, an operation for switching between a single valve mode and a double valve mode can be accomplished extremely easily. In addition, after the switching, the manifold solenoid valve can be assembled with great ease, thus making it possible to obtain a manifold solenoid valve that enables various types of maintenance to be implemented easily and eliminates a possibility of erroneous wiring.

BRIEF DESCRIPTION OF THE DRAWINGS

FIG. 8A and FIG. 8B are block diagrams showing slave chips and solenoid valves for single valves and double valves.

DETAILED DESCRIPTION

Figure 1:
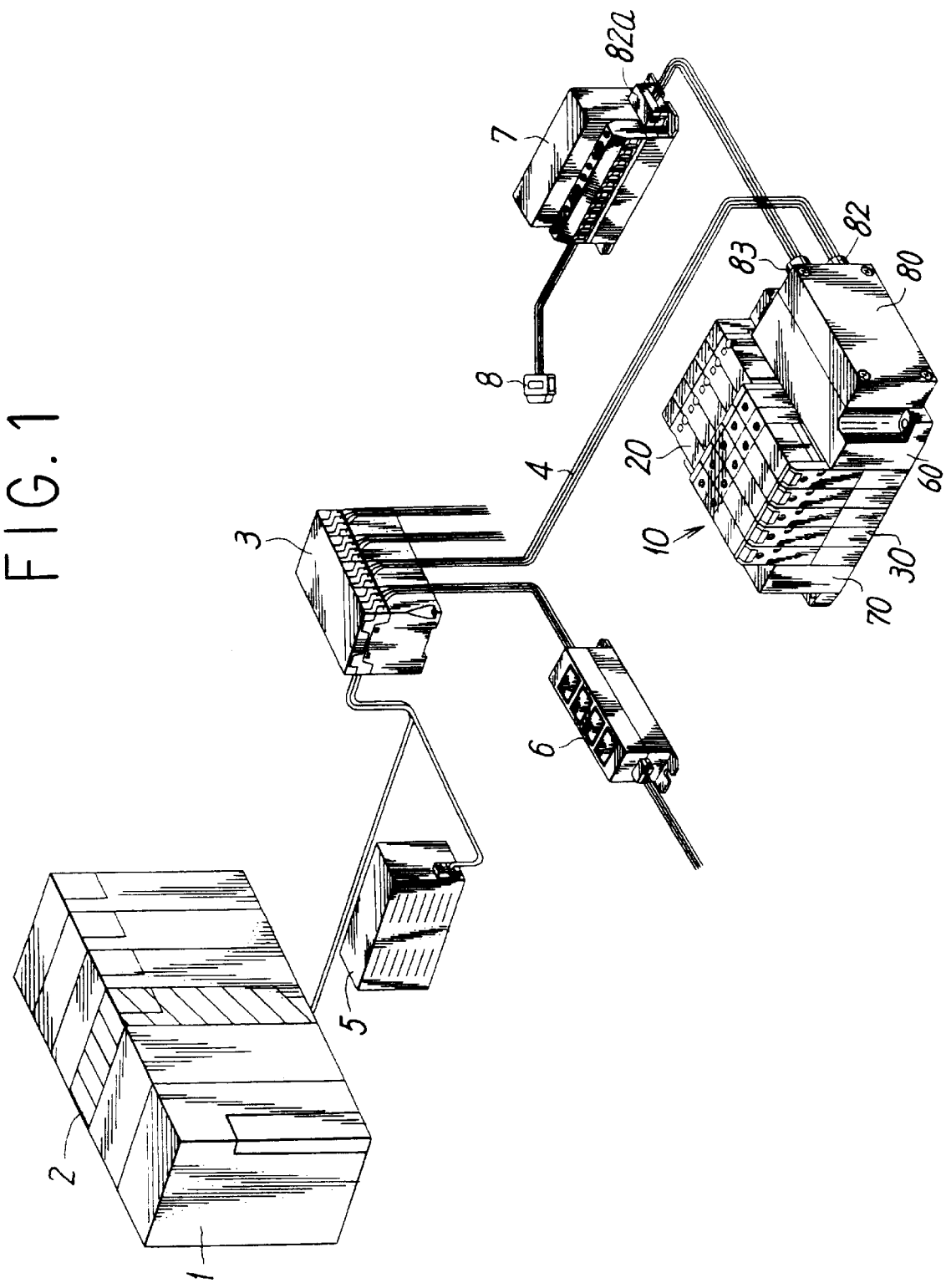
FIG. 1 is a perspective view showing an exemplary configuration of a control system for driving a manifold solenoid valve in accordance with the present invention by serial signals.

FIG. 1 shows an exemplary configuration of a control system for driving a manifold solenoid valve in accordance with the present invention by serial signals.

In the control system, serial signals are transmitted from a serial communication unit 2, an operation of which is controlled by a control unit 1, through a dedicated cable 4 via a gateway 3, to a manifold solenoid valve 10 and other equipment via a connector 6 as necessary. Drive power from a power unit 5 can be supplied together with the foregoing serial signals transmitted through the gateway 3 or supplied separately therefrom. An end unit 8 can be connected to the manifold solenoid valve 10 after connecting an analog device 7 or the like as necessary.

Figure 2:
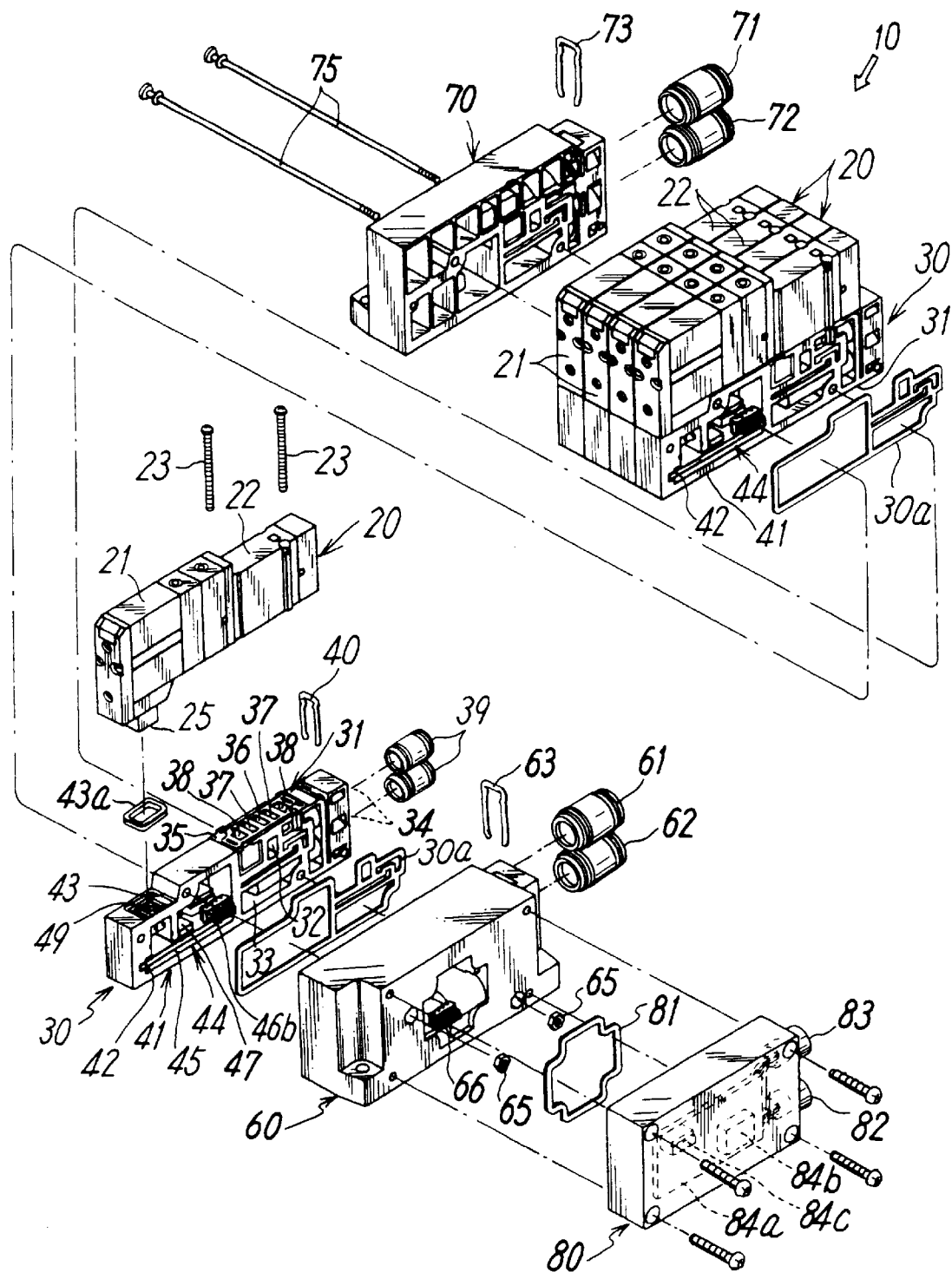
FIG. 2 is an assembly view showing an embodiment of the manifold solenoid valve in accordance with the present invention.

FIG. 2 shows an embodiment of the manifold solenoid valve 10 in accordance with the present invention, an operation of which is controlled by the foregoing serial signals.

The manifold solenoid valve 10 is equipped with solenoid valves 20 composed of three-port single valves or five-port double valves in a quantity required for various applications, a required quantity of manifold blocks 30 on which the solenoid valves 20 are individually mounted and which are interconnected, a supply/exhaust block 60 which is provided at one end of the connected manifold blocks 30 and which supplies and exhausts compressed air through the manifold blocks 30, an end block 70 provided at the other end of the connected manifold blocks 30, and a relay unit 80 which is attached to the supply/exhaust block 60 and which relays serial signals for operation control to be sent to the respective solenoid valves 20 from the gateway 3 through the manifold blocks 30.

The solenoid valve 20 is equipped with a single or a plurality of solenoids therein, and drives a three-port or five-port main valve 22 via a pilot valve 21, which is electromagnetically driven by the solenoids, or directly by the solenoids to thereby switch between air supply and exhaust in the main valve 22. The solenoid valve 20 is secured onto the manifold blocks 30 by mounting screws 23. The solenoid valve 20 is provided with a power receiving terminal 25 electrically connected to a feeder terminal 49, which will be discussed hereinafter, when it is fixed on the manifold block 30. The solenoid valves 20 employ common manifold blocks 30 regardless of whether the solenoid valves 20 are of the three-port or five-port type, so that they can be constructed to have the same external shape, being different only in internal mechanism.

The manifold block 30 is provided with a fluid passage section 31 and an electric circuit section 41. The two sections 31 and 41 may be formed into one piece by a synthetic resin or the like, or may be separately formed and then combined into one piece.

A passage provided in the fluid passage section 31 of the manifold block 30 is comprised primarily of, as in the case of a well-known manifold block, a common passage 32 for air supply and a common passage 33 for exhaust which penetrate the manifold blocks 30 to establish mutual communication with a passage (not shown) in the supply/exhaust block 60, and output passages that supply and discharge an output fluid from the solenoid valves 20 to two output ports 34 and 34 provided in one end surface of the manifold block 30. As necessary, a passage for supply and discharge for a pilot valve is additionally provided. Furthermore, a supply channel 36, output channels 37, exhaust channels 38, etc. for establishing communication between the common passages and the output passages, or the passage for supply/discharge for a pilot valve and supply/discharge openings provided in a mounting surface of the manifold block 30 in the solenoid valve 20 are provided in a solenoid valve mounting surface 35 at a top.

Output port couplers 39 and 39 attached to the output ports 34 and 34 are provided with locking grooves around themselves. The locking grooves are fitted in the output ports 34 and 34 of the manifold block 30, and legs of a U-shaped pin 40 inserted from above the manifold block 30 are engaged with the locking grooves for a securing purpose.

The embodiment described above is based on an assumption that the solenoid valve 20 is provided with two solenoids that are five-port double valves. If the five-port double valves are replaced by three-port single valves, then one solenoid, output port, etc. are rendered effective, while the other one that is unnecessary is rendered ineffective or omitted.

Figure 3:
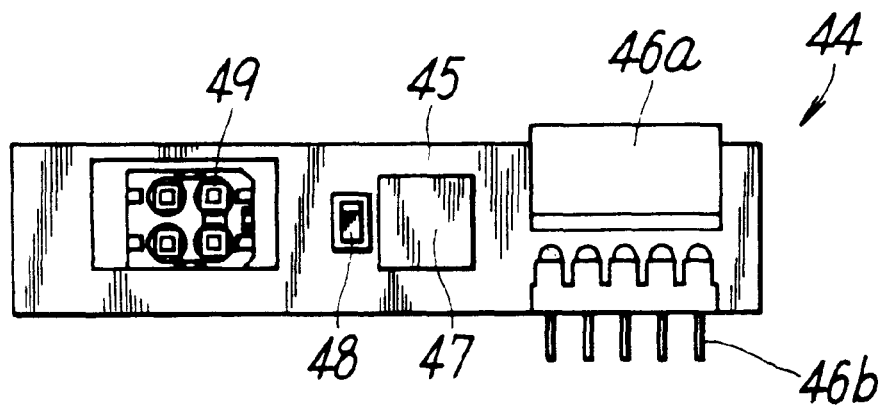
FIG. 3 is a top plan view showing an exemplary configuration of an electric circuit component mounted on the manifold solenoid valve.
Figure 4:
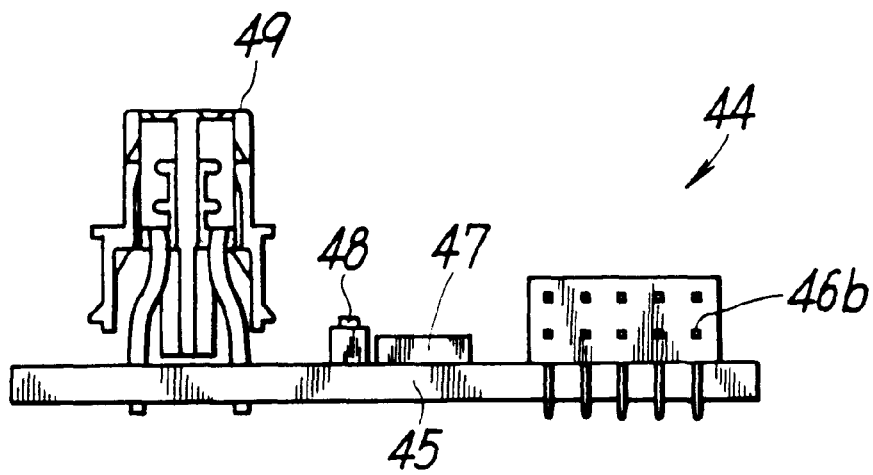
FIG. 4 is a side view of the electric circuit component mounted on the manifold solenoid valve shown in FIG. 3.

The electric circuit section 41 accommodates an electric circuit component 44 therein. As shown in FIG. 3 and FIG. 4, the electric circuit component 44 is provided with female/male connecting terminals 46a and 46b for transmitting serial signals, a slave chip 47 for extracting operation signals for the solenoid valves 20 from serial signals, the feeder terminal 49 for supplying power to the solenoid valves 20 based on the operation signals, and a switching device 48 for switching the slave chip 47 between a single solenoid valve mode and a double solenoid valve mode, which are all mounted on a printed circuit board 45 and are electrically interconnected by printed wiring on the printed circuit board 45. The switching device 48 is comprised of a switch 52 for switching connection of a switching terminal 51 in the slave chip 47 to a terminal 55 at a ground end, as will be discussed hereinafter with reference to FIG. 7 and FIG. 8.

Figure 5:
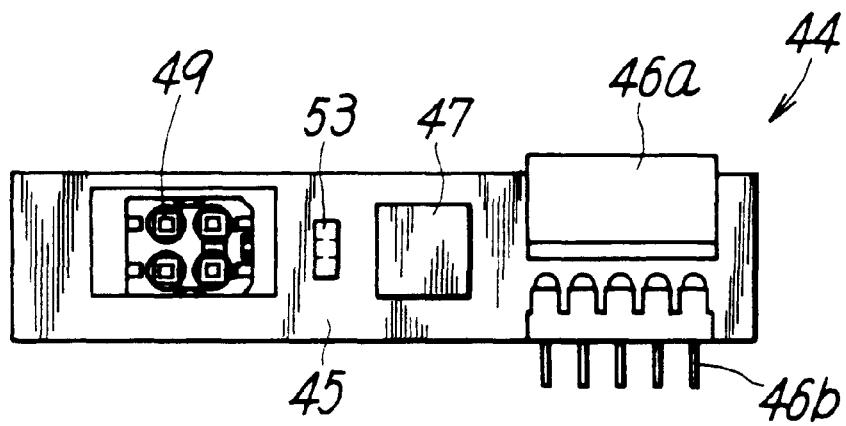
FIG. 5 is a top plan view showing an exemplary configuration of another electric circuit component mounted on the manifold solenoid valve.
Figure 6:
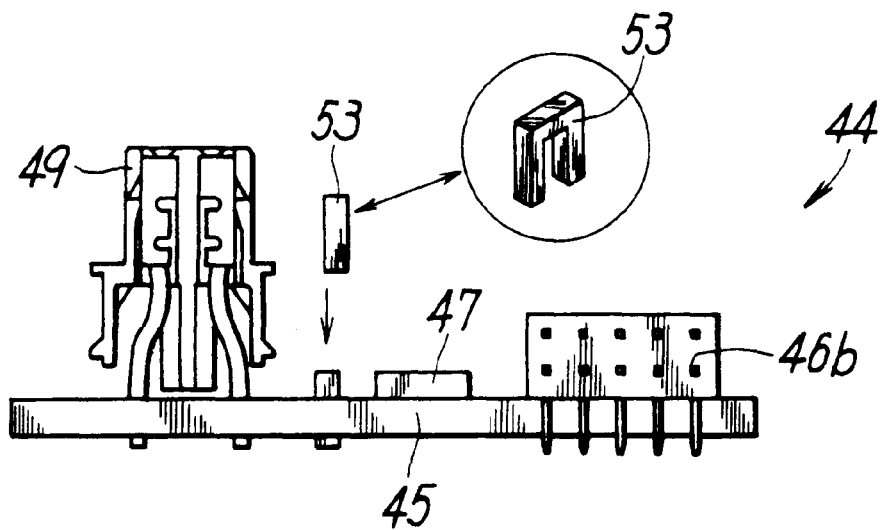
FIG. 6 is a side view of the electric circuit component mounted on the manifold solenoid valve shown in FIG. 5.

The electric circuit component 44 illustrated in FIG. 5 and FIG. 6 has basically the same configuration as that shown in FIG. 3 and FIG. 4; therefore, like reference numerals will be assigned and descriptions thereof will be omitted. The aforesaid switching device 48 is comprised of a U-shaped short pin 53 for selecting whether the switching terminal 51 in the slave chip 47 and the terminal 55 at the ground end are to be connected or not by attaching or detaching it to or from the terminals.

In the electric circuit component 44, as shown in FIG. 2, a mounting groove 42 for the printed circuit board 45 is formed in the electric circuit section 41 of the manifold block 30, the printed circuit board 45 is fitted in the mounting groove 42 and fixed in a predetermined position to be thereby fixedly installed to the electric circuit section 41. It is suited for the printed circuit board 45 to be fixed by screws or the like or stably and detachably fixed by, for example, providing it with a member that elastically engages with the mounting groove 42 when the printed circuit board 45 is inserted in a predetermined position of the mounting groove 42. A flexible circuit board may be used for the printed circuit board 45.

In either example shown in FIG. 3 and FIG. 4 or FIG. 5 and FIG. 6, the female and male connecting terminals 46a and 46b on the printed circuit boards 45 in the adjoining manifold blocks 30 are disposed back-to-back at opposing plate edges on the printed circuit boards 45. Thus, when the printed circuit board 45 is fitted in the predetermined position, the female and male connecting terminals 46a and 46b are provided outwardly at predetermined positions of a surface where the manifold blocks 30 are interconnected. When adjoining manifold blocks 30 are connected at the surface where they are joined to one another by the positioning, the female and male connecting terminals 46a and 46b in the adjoining manifold blocks 30 are interconnected as soon as the common passages 32 and 33 in the manifold blocks 30 are communicated with one another.

An opening 43 for a feeder terminal is provided in a top surface of the electric circuit section 41 in the manifold block 30, and the feeder terminal 49 on the printed circuit board 45 is jutted out to the opening 43. The feeder terminal 49 may be fixedly provided on the printed circuit board 45, or semi-fixedly provided to permit positional adjustment by installing it via a member that is flexible to a certain extent, or connected via a flexible lead wire connected at a predetermined position of the printed circuit board 45, provided that the feeder terminal 49 is disposed at a position where it projects to the opening 43 when the printed circuit board 45 is fitted at a predetermined position of the mounting groove 42 in the electric circuit section 41, or the feeder terminal 49 is disposed at a position where it faces the opening 43 and fixed there by an appropriate means.

Thus, by providing the feeder terminal 49 at a position where it faces the opening 43 in the top surface of the manifold block 30, the feeder terminal 49 is provided at the predetermined position on the manifold block 30. More specifically, when the solenoid valve 20 is mounted on the solenoid valve mounting surface 35 on the manifold block 30 via a gasket, and the supply/discharge opening provided in the solenoid valve 20 is communicated with the supply channel 36, the output channel 37, the exhaust channel 38, etc. opened in the fluid passage 31, the feeder terminal 49 is disposed at the position where it is interconnected with the power receiving terminal 25 provided on the solenoid valve 20. When the feeder terminal 49 and the power receiving terminal 25 are connected, a connector gasket 43a is placed around the opening 43 to seal the electrically connected portion.

A plurality of the manifold blocks 30 described above are connected. The supply/exhaust block 60 for supplying and exhausting compressed air through the connected manifold blocks 30 is provided on one end of the connected manifold blocks 30 and the end block 70 is provided at the other end.

The supply/exhaust block 60 is provided with an air supply coupler 61 and an exhaust coupler 62 on its one end surface. The air supply coupler 61 and the exhaust coupler 62 are communicated with the common passage 32 for air supply and the common passage 33 for exhaust that penetrate the respective manifold blocks 30 to supply air from outside to the common passage 32, and air from the respective solenoid valves 20 is exhausted through the common passage 33. The supply/exhaust couplers 61 and 62 are fixed by engaging legs of a U-shaped pin 63 inserted from above the supply/exhaust block 60 with locking grooves provided around peripheries of the couplers 61 and 62, as in the case of the output port coupler 39 mentioned above. Although not shown, a surface of the supply/exhaust block 60 where it is joined to the manifold block 30 is provided with a female connecting terminal connected to the male connecting terminal 46b provided on the manifold block 30, and a male connecting terminal 66 electrically connected therewith is further provided on an outer surface of the block 60.

The end block 70 is positioned at either end of the manifold blocks 30 consecutively installed together with the supply/exhaust block 60, and they are connected by tension bolts 75 and fixing nuts 65. The end block 70 also closes ends of the common passages 32 and 33, etc. provided such that they penetrate the manifold blocks 30. At the time of connection, gaskets 30a are installed between the respective manifold blocks 30 and between the manifold block 30, the supply/exhaust block 60, and the end block 70 so as to individually seal the fluid passage section 31 and the electric circuit section 41 in the manifold block 30. The gaskets 30a may be installed, taking the fluid passage section 31 and the electric circuit section 41 as discrete units in the manifold block 30.

Furthermore, in the end block 70, a supply coupler 71 and an exhaust coupler 72 can be provided in addition to the supply coupler 61 and the exhaust coupler 62 in the supply/exhaust block 60. In this case also, the two couplers 71 and 72 are fixed using a U-shaped pin 73 inserted from above the end block 70. Although not shown, the end unit 8 (refer to FIG. 1) can be accommodated in the end block 70.

A relay unit 80 attached to the supply/exhaust block 60 via a gasket 81 in a sealed state relays serial signals for operation control from the gateway 3 to be sent to the respective solenoid valves 20 through the manifold blocks 30, and functions to receive and transmit the serial signals. The relay unit 80 is equipped with serial signal connecting terminals 82 and 83 for receiving and transmitting. In the relay unit 80, a required electric or electronic component 84b and a female connecting terminal 84c for transmitting serial signals that is connected to the male connecting terminal 66 in the supply/exhaust block 60 are provided on a printed circuit board 84a.

The relay unit 80 may be installed to one or both of the supply/exhaust block 60 and the end block 70, and may be formed integrally with the supply/exhaust block 60 or the end block 70.

Figure 7:
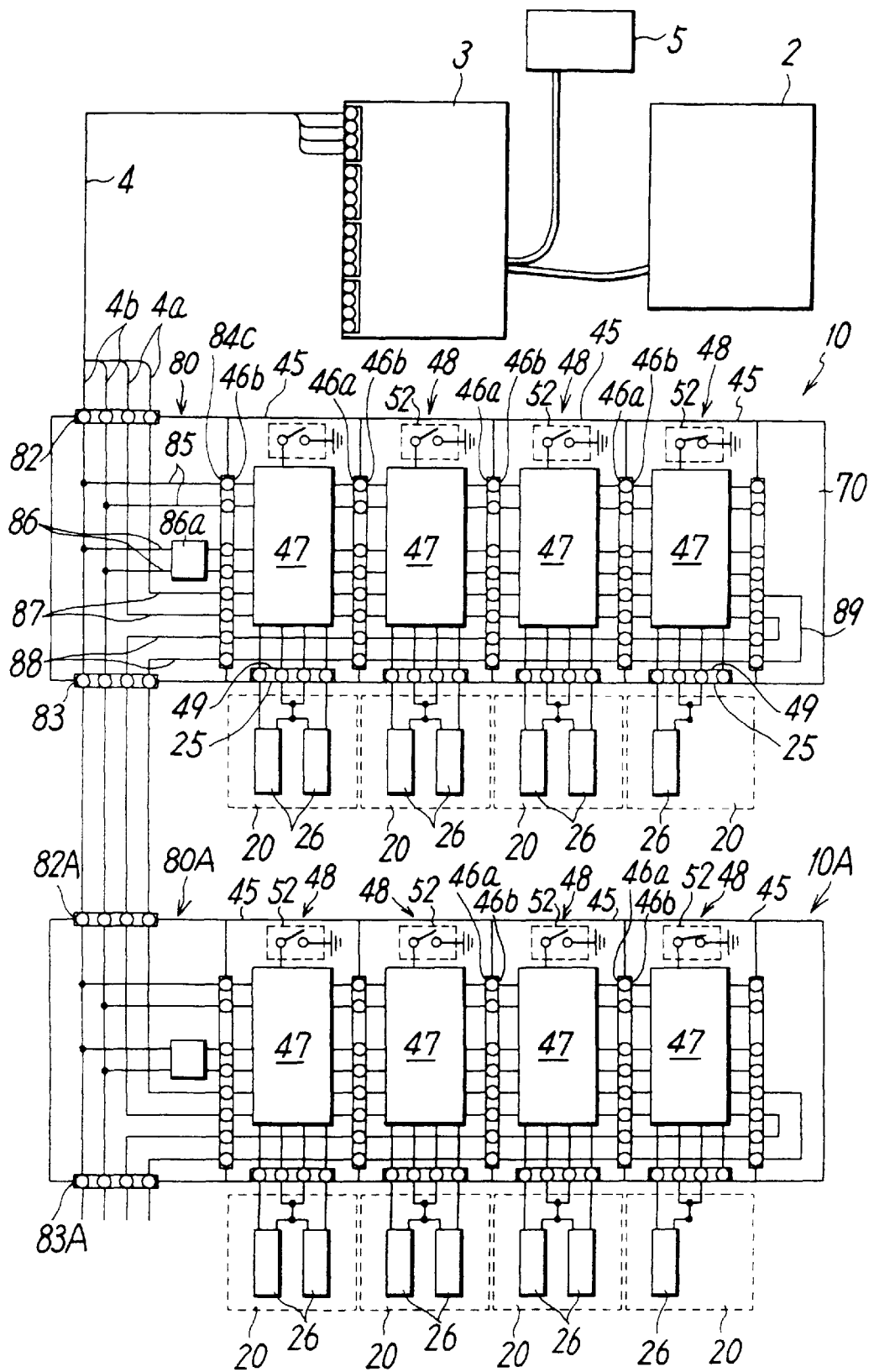
FIG. 7 is a schematic explanatory view showing an outline of signal lines in a relay unit and manifold blocks in the control system of the manifold solenoid valve.

FIG. 7 schematically shows signal lines in the relay unit 80 and the electric circuit component 44 in the manifold block 30 in the control system of the manifold solenoid valve 10. In the control system, as described in conjunction with FIG. 1 previously, serial signals and power signals are transmitted via the gateway 3 from the serial communication unit 2 and the power unit 5, and further transmitted via the receiving connecting terminal 82 to the relay unit 80 provided in the manifold solenoid valve 10 through the dedicated cable 4 comprised of a serial signal line 4a and a power signal line 4b. The drive power from the power unit 5 can alternatively be supplied separately from serial signals transmitted through the gateway 3. As necessary, a transmitting end of the relay unit 80 can be connected to a similar relay unit 80A of a manifold solenoid valves 10A or other analog equipment 7, etc. in succession via connecting terminals 83 and 82A, and their transmitting ends can be also connected to other equipment, etc. via the connecting terminal 83A.

Serial signals introduced into the relay unit 80 are transmitted from the female connecting terminal 84c provided therein to slave chips 47 on the printed circuit board 45, which is accommodated in the manifold block 30, via the supply/exhaust block 60, which is omitted in FIG. 7, (see FIG. 1 and FIG. 2) and further via the male connecting terminal 46b of the manifold block 30 adjacent to the block 60. Operation outputs for supplying or cutting off power to the solenoid valves 20 mounted on the individual manifold blocks 30 are provided by switching operation of an output circuit based on serial signals in the respective slave chips 47. The outputs are transmitted to solenoids 26 of the respective solenoid valves 20 from the feeder terminals 49 via the receiving terminals 25 of the solenoid valves 20. The serial signals are transmitted in sequence to the slave chips 47, which control the operations of the solenoid valves 20 in the following stage, via the female and male connecting terminals 46a and 46b.

The solenoids 26 provided on the solenoid valves 20 function to operate pilot valves 21, among which only one solenoid 26 provided on the single solenoid valve 20 makes up a single valve (a three-port valve) as shown in FIG. 8A, while two solenoids 26 provided on the single solenoid valve 20 make up a double valve (a five-port valve) as shown in FIG. 8B.

Transmission lines 85 connected to the slave chips 47 are power lines for driving solenoid valves, transmission lines 86 are control power lines connected via a 5V power source 86a, transmission lines 87 are signal lines for transmitting serial signals S1 and S2, and transmission lines 88 are return signal lines for serial signals. In the drawing, reference numeral 89 denotes a short-circuit line provided in the end block 70.

A control system in the manifold solenoid valve 10A connected via the connecting terminals 83 and 82A to the transmitting end of the relay unit 80 provided in the manifold solenoid valve 10 is substantially the same as the manifold solenoid valve 10. Hence, primary identical or equivalent parts will be assigned like reference numerals, and descriptions thereof will be omitted.

Depending on whether the solenoid valves 20, the drive of which is controlled by the slave chips 47, are the single valves or the double valves, the control system must be adapted accordingly. For this purpose, the slave chips 47 are configured so that they can be switched between the single valve mode and the double valve mode by the switching devices 48 attached thereto as shown in FIG. 7 and FIG. 8. For the switching devices 48, the switches 52 or the U-shaped short pin 53 as shown in FIG. 5 and FIG. 6 may be used. The slave chip 47 can be switched between the single valve mode and the double valve mode by connecting or disconnecting switching terminal 51 to or from the ground terminal 55 by the switch 52, or by installing the short pin 53 between the switching terminal 51 and the ground terminal 55 or removing the short pin 53 from therebetween. The slave chip 47 wherein the switching terminal 51 is connected to the ground terminal 55 as illustrated in FIG. 8A is for the single valve, while the slave chip 47 wherein the switching terminal 51 is opened as illustrated in FIG. 8B is for the double valve.

Thus, by providing the slave chips 47 constituting the control system for driving the solenoid valves 20 on the printed circuit board 45 detachably installed in the electric circuit section 41 of each manifold block 30, and by making them switchable between the single valve mode and the double valve mode by means of the simple switching device 48 comprised of the switch 52 attached thereto or the short pin 53 or the like, it becomes possible to easily adapt the control system to the solenoid valves 20 when assembling the manifold solenoid valve 10 and also to easily switch the control system that controls the solenoid valves to the single valve mode or the double valve mode when changing any of the solenoid valves 20 mounted on the manifold blocks 30 between the single valves and the double valves.

Moreover, in the manifold solenoid valve 10 set forth above, simply stacking and connecting the manifold blocks 30 permits fluid passages and serial signal lines to be automatically connected, or simply detaching the manifold blocks 30 permits the electric circuit component 44 constituting the control system to be taken out. Hence, an operation for switching between the single valve mode and the double valve mode by the switching device 48 can be accomplished extremely easily. In addition, after the switching, the manifold solenoid valve 10 can be assembled with great ease, thus making it possible to obtain a manifold solenoid valve that enables various types of maintenance to be implemented easily and eliminates a possibility of erroneous wiring.

According to the manifold solenoid valve driven by serial signals described in detail above, in controlling the drive of the manifold solenoid valve by serial signals, the control systems for single valves and double valves can be configured by an easy switching operation in a single control system. This makes it possible to easily adapt the control system to solenoid valves when assembling a manifold solenoid valve and also to easily switch the control system that controls the solenoid valves when changing any of the solenoid valves mounted on manifold blocks between single valves and double valves. Furthermore, in the manifold solenoid valve, the moment the manifold blocks are connected, serial signal lines for controlling the solenoid valves are connected, thus permitting extremely easy assembly and easy maintenance, and also eliminating a possibility of erroneous wiring.

What is claimed is:

1. In a manifold solenoid valve that comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, a manifold solenoid valve driven by serial signals wherein;
an electric circuit component provided with female and male connecting terminals for transmitting serial signals that are electrically connected with one another, a slave chip for extracting operation signals for the solenoid valves from the serial signals, a feeder terminal for supplying power to the solenoid valves based on the operation signals, and a switching device for switching the slave chip between a single solenoid valve mode and a double solenoid valve mode, which are mounted on a printed circuit board, is detachably installed in an electric circuit section of each manifold block; and
the female and male connecting terminals on the printed circuit board in each of adjoining manifold blocks are disposed at positions where they are connected with one another when common passages of the manifold blocks are communicated with one another as the manifold blocks are connected.

2. A manifold solenoid valve driven by serial signals according to claim 1, wherein the switching device provided on the printed circuit board is constructed by a switch for switching connection of a switching terminal in the slave chip to a ground end.

3. A manifold solenoid valve driven by serial signals according to claim 1, wherein the switching device provided on the printed circuit board is constructed by a short pin for selecting whether or not to connect the switching terminal in the slave chip to the ground end by attaching or detaching the short pin.

* * * * *